United States Patent
Rao et al.

(10) Patent No.: US 11,971,541 B2
(45) Date of Patent: Apr. 30, 2024

(54) RECONFIGURABLE OPTICS FOR MULTI-PLANE HEADS-UP DISPLAYS

(71) Applicant: Harman International Industries, Incorporated, Stamford, CT (US)

(72) Inventors: Rashmi Rao, West Bloomfield, MI (US); Benjamin Edward Lewis, Livonia, MI (US); Andrew Descisciolo, Farmington Hills, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 860 days.

(21) Appl. No.: 17/050,391

(22) PCT Filed: Mar. 4, 2019

(86) PCT No.: PCT/US2019/020619
§ 371 (c)(1),
(2) Date: Oct. 23, 2020

(87) PCT Pub. No.: WO2019/212636
PCT Pub. Date: Nov. 7, 2019

(65) Prior Publication Data
US 2021/0132377 A1     May 6, 2021

Related U.S. Application Data

(60) Provisional application No. 62/667,355, filed on May 4, 2018.

(51) Int. Cl.
*G02B 27/01*     (2006.01)
*B60K 35/00*    (2024.01)
(Continued)

(52) U.S. Cl.
CPC .......... *G02B 27/0101* (2013.01); *B60K 35/00* (2013.01); *G02B 7/04* (2013.01);
(Continued)

(58) Field of Classification Search
None
See application file for complete search history.

(56) References Cited

U.S. PATENT DOCUMENTS

| | | | |
|---|---|---|---|
| 7,864,419 B2 | 1/2011 | Cossairt et al. | |
| 2005/0052617 A1* | 3/2005 | Fujikawa | H04N 13/305 359/462 |

(Continued)

FOREIGN PATENT DOCUMENTS

| | | |
|---|---|---|
| CN | 104865702 A | 8/2015 |
| JP | H08254757 A | 10/1996 |

(Continued)

OTHER PUBLICATIONS

ISA European Patent Office, International Search Report and Written Opinion Issued in Application No. PCT/US2019/020619, dated Jul. 3, 2019, WIPO, 17 pages.

(Continued)

*Primary Examiner* — Robert E. Tallman
(74) *Attorney, Agent, or Firm* — McCoy Russell LLP

(57) ABSTRACT

Embodiments are disclosed for display configurations for providing an augmented reality heads up display. In one example, a mirrorless heads up display device includes a display, at least one micro lens array, an optical element comprising a lenticular lens or parallax barrier positioned between the display and the at least one micro lens array, and a display controller comprising a processor and memory storing instructions executable by the processor to control the display to output image light that passes through the lenticular lens or parallax barrier and the at least one micro (Continued)

lens array and impinges on a transparent plane to form a three-dimensional image.

18 Claims, 11 Drawing Sheets

(51) Int. Cl.
| | | |
|---|---|---|
| G02B 7/04 | (2021.01) | |
| G02B 26/08 | (2006.01) | |
| G02B 27/00 | (2006.01) | |
| G02B 30/29 | (2020.01) | |
| G06F 3/01 | (2006.01) | |
| G06F 3/14 | (2006.01) | |
| G06T 19/00 | (2011.01) | |
| G09G 3/3208 | (2016.01) | |
| G09G 3/34 | (2006.01) | |
| G09G 3/36 | (2006.01) | |
| G09G 5/38 | (2006.01) | |
| B60K 35/10 | (2024.01) | |
| B60K 35/21 | (2024.01) | |
| B60K 35/23 | (2024.01) | |
| B60K 35/28 | (2024.01) | |
| B60K 35/40 | (2024.01) | |
| B60K 35/60 | (2024.01) | |
| B60K 35/65 | (2024.01) | |
| B60K 35/81 | (2024.01) | |

(52) U.S. Cl.
CPC ..... *G02B 26/0875* (2013.01); *G02B 27/0093* (2013.01); *G02B 27/0179* (2013.01); *G02B 30/29* (2020.01); *G06F 3/013* (2013.01); *G06F 3/1423* (2013.01); *G06T 19/006* (2013.01); *G09G 3/3208* (2013.01); *G09G 3/3426* (2013.01); *G09G 3/36* (2013.01); *G09G 5/38* (2013.01); *B60K 35/10* (2024.01); *B60K 35/211* (2024.01); *B60K 35/23* (2024.01); *B60K 35/28* (2024.01); *B60K 35/415* (2024.01); *B60K 35/60* (2024.01); *B60K 35/65* (2024.01); *B60K 35/81* (2024.01); *B60K 2360/149* (2024.01); *B60K 2360/166* (2024.01); *B60K 2360/167* (2024.01); *B60K 2360/177* (2024.01); *B60K 2360/332* (2024.01); *B60K 2360/349* (2024.01); *B60K 2360/741* (2024.01); *B60K 2360/785* (2024.01); *G02B 2027/0118* (2013.01); *G02B 2027/0127* (2013.01); *G02B 2027/0134* (2013.01); *G02B 2027/0181* (2013.01); *G02B 2027/0183* (2013.01); *G02B 2027/0185* (2013.01); *G02B 2027/0187* (2013.01); *G09G 2354/00* (2013.01); *G09G 2360/144* (2013.01); *G09G 2380/10* (2013.01)

(56) References Cited

U.S. PATENT DOCUMENTS

| | | |
|---|---|---|
| 2008/0112056 A1 | 5/2008 | Raymond et al. |
| 2015/0098029 A1 | 4/2015 | Sato et al. |
| 2015/0219803 A1 | 8/2015 | Inamoto et al. |
| 2018/0095284 A1 | 4/2018 | Welch et al. |
| 2018/0372923 A1 | 12/2018 | Wijaya et al. |

FOREIGN PATENT DOCUMENTS

| | | | |
|---|---|---|---|
| JP | 2007094394 A | | 4/2007 |
| JP | 2015534125 A | | 11/2015 |
| JP | 3209552 U | | 3/2017 |
| KR | 20120011228 A | | 2/2012 |
| KR | 101131983 B1 | | 3/2012 |
| TW | 201732370 A | | 9/2017 |
| TW | I615632 B | | 2/2018 |
| WO | 2010029717 A1 | | 3/2010 |
| WO | 2017097382 A1 | | 6/2017 |

OTHER PUBLICATIONS

SA European Patent Office, International Search Report and Written Opinion Issued in Application No. PCT/US2019/020616, dated Jul. 26, 2019, WIPO, 19 pages.
SA European Patent Office, International Search Report and Written Opinion Issued in Application No. PCT/US2019/020617, dated Aug. 7, 2019, WIPO, 17 pages.
Rao, R. et al., "Adjustable Three-Dimensional Augmented Reality Heads up Display," U.S. Appl. No. 17/050,381, filed Oct. 23, 2020, 40 pages.
Rao, R. et al., "Enhanced Augmented Reality Experience On Heads up Display," U.S. Appl. No. 17/050,383, filed Oct. 23, 2020, 39 pages.
Rao, R. et al., "Reconfigurable Optics for Multi-Plane Heads-Up Displays," U.S. Appl. No. 17/050,386, filed Oct. 23, 2020, 39 pages.
International Bureau of WIPO, International Preliminary Report on Patentability Issued in Application No. PCT/US2019/020616, dated Nov. 10, 2020, WIPO, 13 pages.
International Bureau of WIPO, International Preliminary Report on Patentability Issued in Application No. PCT/US2019/020617, dated Nov. 10, 2020, WIPO, 11 pages.
International Bureau of WIPO, International Preliminary Report on Patentability Issued in Application No. PCT/US2019/020618, dated Nov. 10, 2020, WIPO, 11 pages.
International Bureau of WIPO, International Preliminary Report on Patentability Issued in Application No. PCT/US2019/020619, dated Nov. 10, 2020, WIPO, 11 pages.

* cited by examiner

RECONFIGURABLE OPTICS FOR MULTI-PLANE HEADS-UP DISPLAYS

CROSS-REFERENCE TO RELATED APPLICATIONS

The present application is a U.S. National Phase of International Application No. PCT/US2019/020618, entitled "RECONFIGURABLE OPTICS FOR MULTI-PLANE HEADS-UP DISPLAYS", and filed on Mar. 4, 2019. International Application No. PCT/US2019/020618 claims priority to U.S. Provisional Application No. 62/667,355 entitled "MIRRORLESS HEADS UP DISPLAY", and filed on May 4, 2018. The entire contents of the above-identified application are hereby incorporated by reference for all purposes.

FIELD

The disclosure relates to see-through display configurations including three-dimensional mirrorless display devices for providing a heads up display.

BACKGROUND

Augmented reality systems may be used to insert virtual (e.g., computer-generated) objects into a field of view of a user in order to make the virtual objects appear to the user to be integrated into a real-world environment. For example, a see-through display device may both display virtual objects and allow light from a real-world environment to pass through to a viewer, such that the viewer sees the real-world environment and the virtual objects through the display device.

SUMMARY

See-through displays may be used in a variety of environments, including a vehicle heads-up display. Such heads-up displays often provide a two-dimensional display and/or augmented reality experience that overlays images in a projected space that occupies up to two planes (e.g., a near plane and a far plane). By constraining the experience to the two planes, the relationship between the augmented reality image and a real-world environment is limited, especially in a moving environment such as an environment of a vehicle with a heads-up display that is used during vehicle travel. The disclosure provides for a three-dimensional augmented reality display system that includes an optical element to split the left and right eye image for every pixel of the image and then, using eye tracking, ties the left and right eye image back to where a user's eyes are focused. In this way, the disclosure provides a dynamic way of changing the focal point of where the image is tied together to create a continuous plane wherever the user is focusing, create a stereoscopic image there, and then keep moving that stereoscopic image as the environment and/or user focal point moves. In this way, a projected image may no longer be limited to near- and far-field positions, but may be positioned anywhere (e.g., at any horizontal, vertical, and depth location) in a three-dimensional field of view of the user and continuously re-positioned as the environment and/or user focus moves. For example, while a projected image in other augmented reality systems may only be positioned at one of two depths (e.g., near- and far-field), a projected image generated by the disclosed system may be positioned at any depth in a range (e.g., appearing to be located anywhere from 5 meters to 75 meters away from a user, as one non-limiting example range).

In many environments, issues such as space and power consumption may present challenges to the integration of see-through displays with an existing construct. For example, in a vehicle environment, components of a display system may be integrated in crowded locations, such as instrument panels, vehicle body structures (e.g., A-pillars), a rear-view mirror housing, etc. Furthermore, as vehicles operate on fuel (e.g., gasoline, electricity, natural gas, and/or a combination thereof), it may be beneficial to keep a power consumption of in-vehicle elements as low as possible. Another consideration for see-through displays, such as heads-up displays in a vehicle, includes provisions for providing one or both of world-locked virtual images (e.g., images or portions of images that move with the environment) and viewer-locked (or vehicle-locked) virtual images (e.g., images or portions of images that appear to remain in a same location relative to a viewer even as the viewer/vehicle moves through the environment). The disclosure provides mechanisms for providing various combinations of the space-saving, power-saving, and image locking features discussed above.

As one example, the disclosure provides for a mirrorless heads up display device includes a display, at least one micro lens array, an optical element comprising a lenticular lens or parallax barrier positioned between the display and the at least one micro lens array, and a display controller comprising a processor and memory storing instructions executable by the processor to control the display to output image light that passes through the lenticular lens or parallax barrier and the at least one micro lens array and impinges on a transparent plane to form a three-dimensional image.

As another example, the disclosure provides for a three-dimensional, mirrorless, low profile, power efficient, augmented reality heads up display. The three-dimensional mirrorless display may leverage optical gratings to create mirrorless imaging and/or projection. A parallaxial or lenticular element (e.g., film) may be included in the display configuration to generate auto-stereoscopic images. In some examples, the generated images may leverage eye-tracking capabilities. Optical elements in the parallaxial or lenticular element may be overlapping, thereby allowing the use of a lower resolution source for original image generation, which provides a low cost, high efficiency (high transmission), and low power consumption display (relative to displays that do not utilize overlapping optical elements). The original image generator may utilize transmissive display technology (e.g., liquid crystal display, LCD) and/or micro element-based technology (e.g., digital light processing microelectromechanical system, DLP MEMS). Examples that utilize transmissive displays may include a backlighting element that includes a matrix of light-emitting diodes (LED), which increases the power efficiency of the display relative to other backlighting configurations. For example, the backlighting may utilize localized dimming technology to avoid powering backlights that are not used in generating a desired image. The backlight may include a matrix of mini light-emitting diodes (mini-LED) or micro-light-emitting diodes (micro-LED). A free-form LED may be embedded in silica to provide low profile and/or small packaging for the backlighting. A driver or other user's gaze may be tracked and used to drive portions of the display to intersect the gaze (or to react to input provided via the gaze).

In some examples of the above-described display, a three-dimensional elements, such as a parallaxial or lenticular lens element, included in the display configuration may be movable to dynamically change the three-dimensional depth perception. The mobility of the three-dimensional element may also allow the position of the optical element to be controlled when high sunload environments are detected in order to automatically reduce the sunload on the display. For example, infrared (IR) detection may be performed using photodiodes behind a cold mirror (e.g., in the display configuration) to actively detect sunload and control a large mirror and/or a lenticular/parallaxial element to move to provide a countermeasure to the sunload. An additional or alternative feature of a lenticular lens in one of the above-described display configurations includes a variable prescription feature. For example, a prescription of the lenticular lens may be adjusted (e.g., by changing a radius and/or orientation of a portion of the lenticular lens) to correct for and/or otherwise counteract field curvature of a far field.

In another example, one or more lens elements may have positions that are adjustable via user input. For example, one or more lenses in a display configuration may be adjusted in space based on user input to create comfort in viewing images generated by the display configuration. An adjustable zoom lens may be included in the display configuration and moved in physical space (e.g., responsive to user input) to change a depth of the image field seen in space.

The disclosure also provides for display configurations that provide multiple overlapping image planes in space (e.g., multiple two-dimensional overlapping image planes). In one example display, chromatic films may be used to provide dense spectral combining to create the multiple images. For example, the chromatic films may allow certain light to pass through while reflecting others, allowing for overlapping imagery in three-dimensional space. As another example, a display configuration may include lasers that create multiple holographic sheets to provide overlapping imagery. In another example, a display configuration may include multiple LCD displays to create multiple planes of images. For example, two LCD transmissive displays may be positioned to enable polarized light at specific angles to enable reflection at Brewster's angles. In such examples, an additional retardation film may be used in the display configuration to create multiple image planes. As still another example, multiple near and far plane projections may be provided using organic light-emitting diode (OLED) or optical coatings and projection technology. For example, a near plane may be provided via a transparent OLED as windshield glass or a photosensitive material embedded in the windshield glass, while a far plane may be provided using an LCD or MEMS-based projection. The above-described configuration may allow for multiple image planes without using high volume/high profile projection systems, and thus may have lower power consumption than the other projection systems.

BRIEF DESCRIPTION OF THE DRAWINGS

The disclosure may be better understood from reading the following description of non-limiting embodiments, with reference to the attached drawings, wherein below.

DETAILED DESCRIPTION

The disclosure provides for display configurations that address the above-described issues that may arise in forming a heads up display in an environment such as a vehicle. For example, the disclosure describes a mirrorless three-dimensional display configuration that may decrease a packaging size relative to other display configurations.

The disclosure also describes example configurations that utilize selectively dimmable backlighting for displays to decrease a power consumption relative to other display configurations. The disclosure also describes increasing a user experience (e.g., increasing user comfort by adjusting a depth of field of displayed images) relative to other display configurations by providing movable optical elements. Examples for using near and far plane projections are also described to better integrate a displayed image with a background environment relative to other display configurations. Adjustments to structural configurations of optical elements, such as adjustments to a prescription of a lenticular lens, are described in order to increase an image quality when images are displayed using a curved field (e.g., a curved windshield). The described features may be used in any combination to achieve a display configuration that addresses the particular complications that arise in a given environment.

Figure 1:
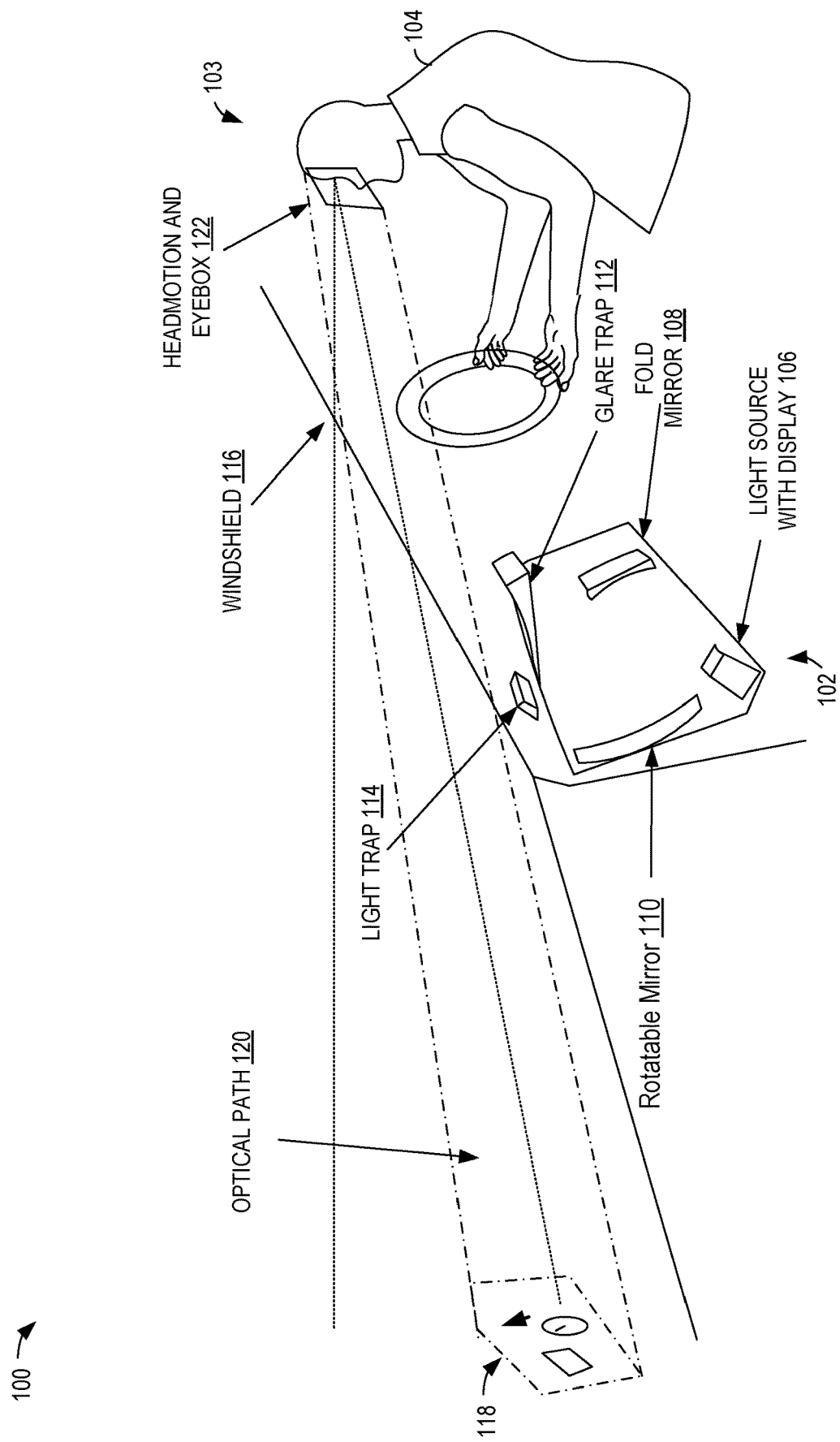
FIG. 1 shows an example augmented reality environment in accordance with one or more embodiments of the present disclosure.

FIG. 1 shows an example augmented reality environment 100, in which an in-vehicle display system 102 of a vehicle 103 is controlled to project virtual images into an environment of a user 104. The environment in the illustrated example is a vehicle, however it is to be understood that one or more of the below-described components may be included in a display configuration that is used in another augmented reality environment without departing from the scope of this disclosure.

The display system 102 includes a light source with display unit 106, which may project light in a controlled manner to form virtual images. The display unit 106 may project light toward a fold mirror 108, which may be planar or aspherical, and which reflects received light toward a rotatable mirror 110, which may be aspherical. The rotatable mirror may direct light toward a glare trap 112 and light trap 114, usable to control the light to appear in a position that is viewable through a windshield 116 to appear at a virtual location 118. The virtual location 118 may be controlled to be within an optical path 120 that originates from a head-motion and eyebox 122 of the user 104 and represents at least a portion of a viewable range of the user 104.

Figure 2A:
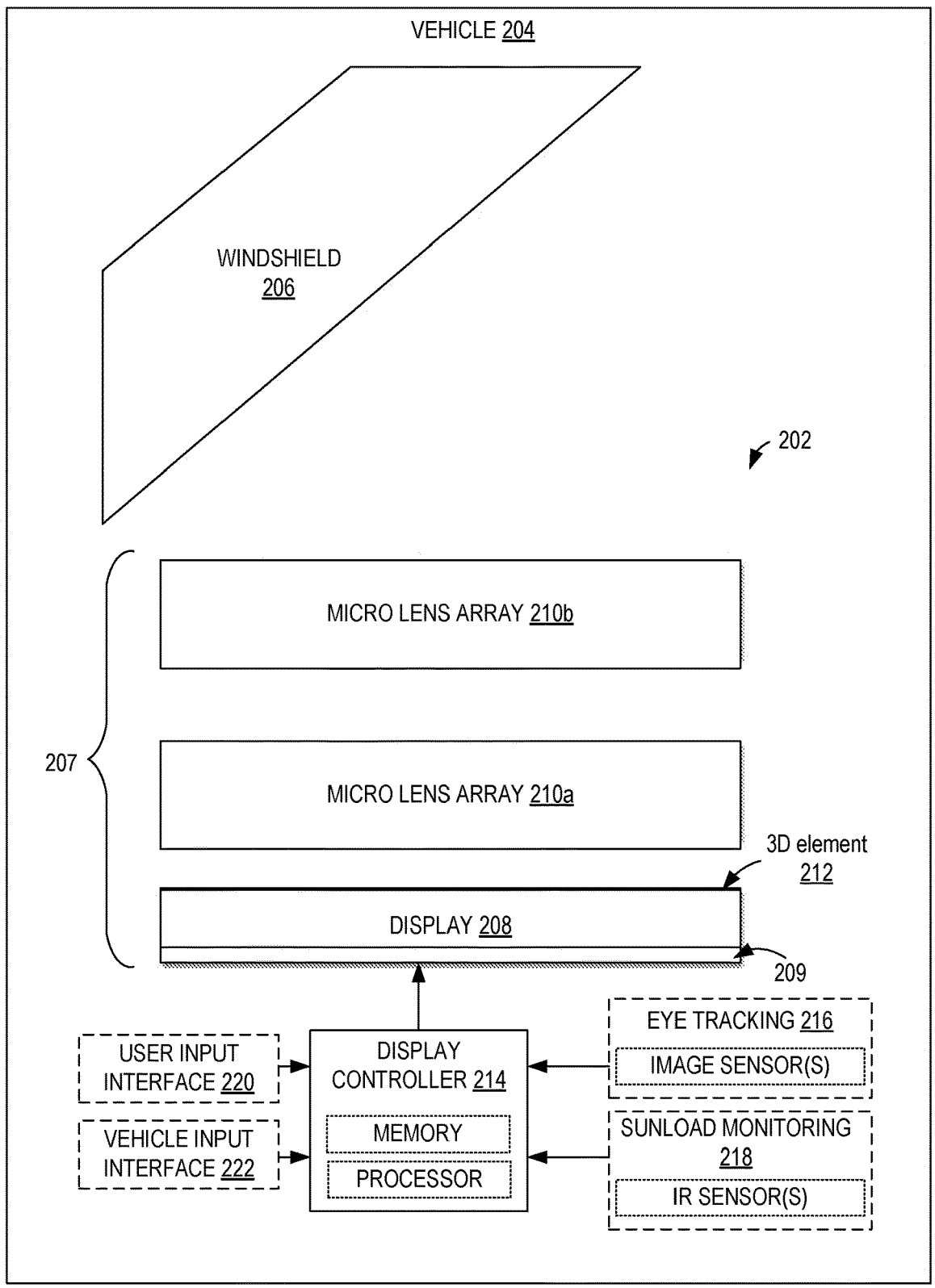
FIG. 2A shows an example block diagram of a mirrorless display configuration in accordance with one or more embodiments of the present disclosure.

As shown in FIG. 1, the use of mirrors in the display configuration causes the display system to occupy a large amount of space within the vehicle 103. FIG. 2A shows an example mirrorless three-dimensional display configuration 202 that may be used to decrease packaging size relative to mirrored display configurations. The display configuration 202 of FIG. 2A may be included inside a vehicle 204 and configured to project light onto and/or through a windshield 206. The display configuration may include a display 208, one or more micro lens arrays 210a and 210b, and a three-dimensional element 212 positioned between the display 208 and micro lens array 210a. The three-dimensional element 212 may include a parallaxial or lenticular element (e.g., film) that generates auto-stereoscopic images from the output of display 208. The display 208 may include transmissive display technology (e.g., a liquid crystal display, LCD) and/or micro element-based display technology (e.g., digital light processing microelectromechanical system, DLP MEMS). The micro lens array(s) may be positioned relative to the windshield 206 such that an entirety of the windshield or a selected portion of the windshield serves as a display surface (e.g., a transparent plane onto which three-dimensional display images are projected). In this way, the field of view of the display system may be sized according to the number and arrangement of micro lens arrays, which may provide for a display that has a larger field of view than other configurations (e.g., mirrored configurations). The display 208 may be illuminated via a backlight array 209, which includes a matrix of light sources (e.g., light-emitting diodes) distributed along a back of the display 208. As shown, the display 208, backlight 209, 3D element 212, and micro lens array(s) 210a and/or 210b may collectively form a display unit 207. Although shown separately, in some examples, display controller 214 may also be included in the display unit 207.

Figure 2B:
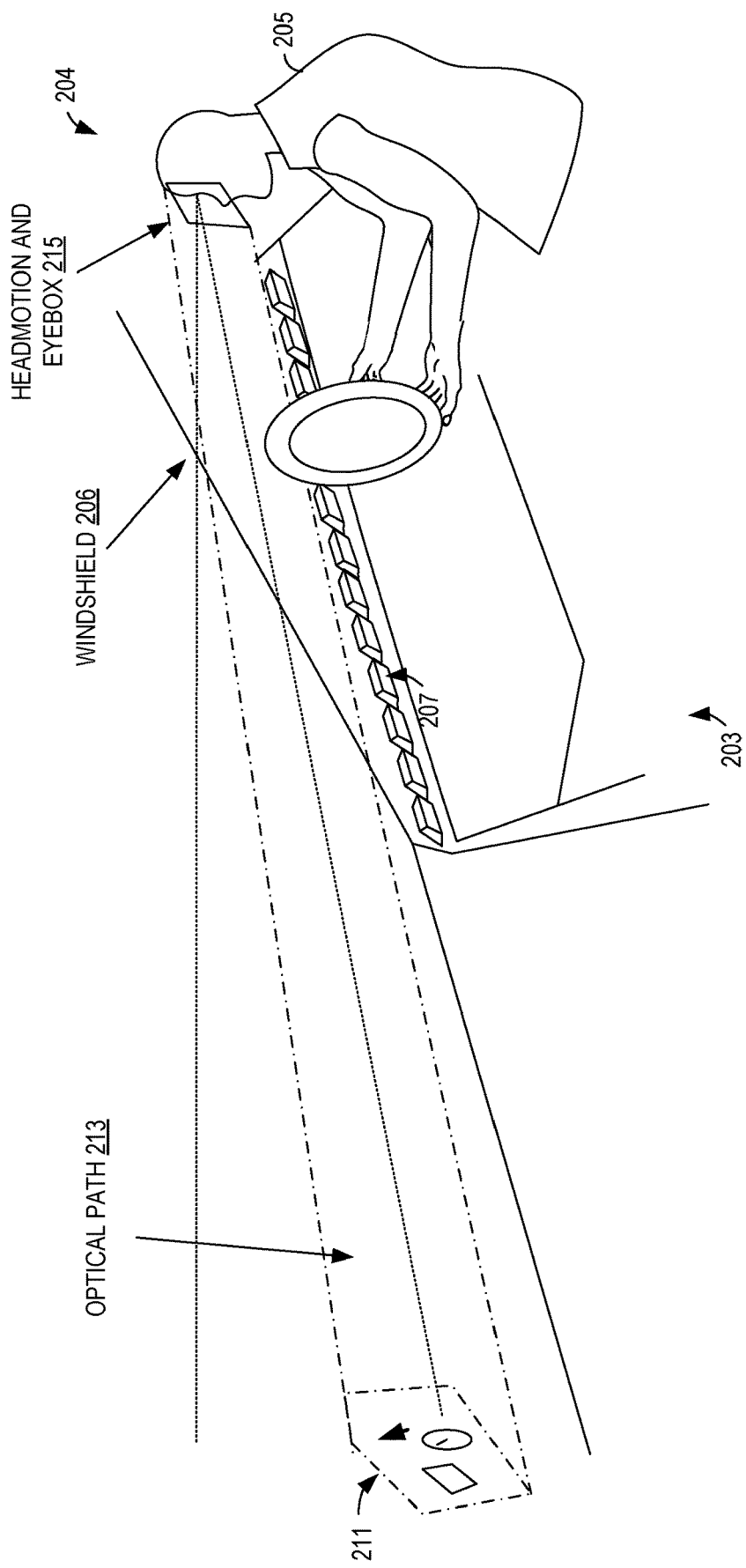
FIG. 2B shows an example schematic view of a mirrorless display configuration in a vehicle cabin in accordance with one or more embodiments of the present disclosure.

Turning briefly to FIG. 2B, a schematic representation of a cabin 203 of vehicle 204 is shown, in which a user 205 is seated. A plurality of display units 207 are distributed across the windshield 206 (e.g., to form an array of display units 207) to control image light to appear in a position that is viewable through the windshield 206 to appear at a virtual location 211. The virtual location 211 may be controlled to be within an optical path 213 that originates from a head-motion and eyebox 215 of the user 205 and represents at least a portion of a viewable range of the user 205. As described above with respect to FIG. 2A, each display unit 207 may include a display (e.g., display 208) with an array of backlights (e.g., backlight 209), one or more micro lens arrays (e.g., micro lens array 210a and/or 210b, and a 3D element (e.g., 3D element 212) positioned between the display and the micro lens array(s). Each display unit 207 may be controlled by an individual display controller (e.g., display controller 214) and/or a single display controller may control the display of each display unit 207.

Figure 2C:
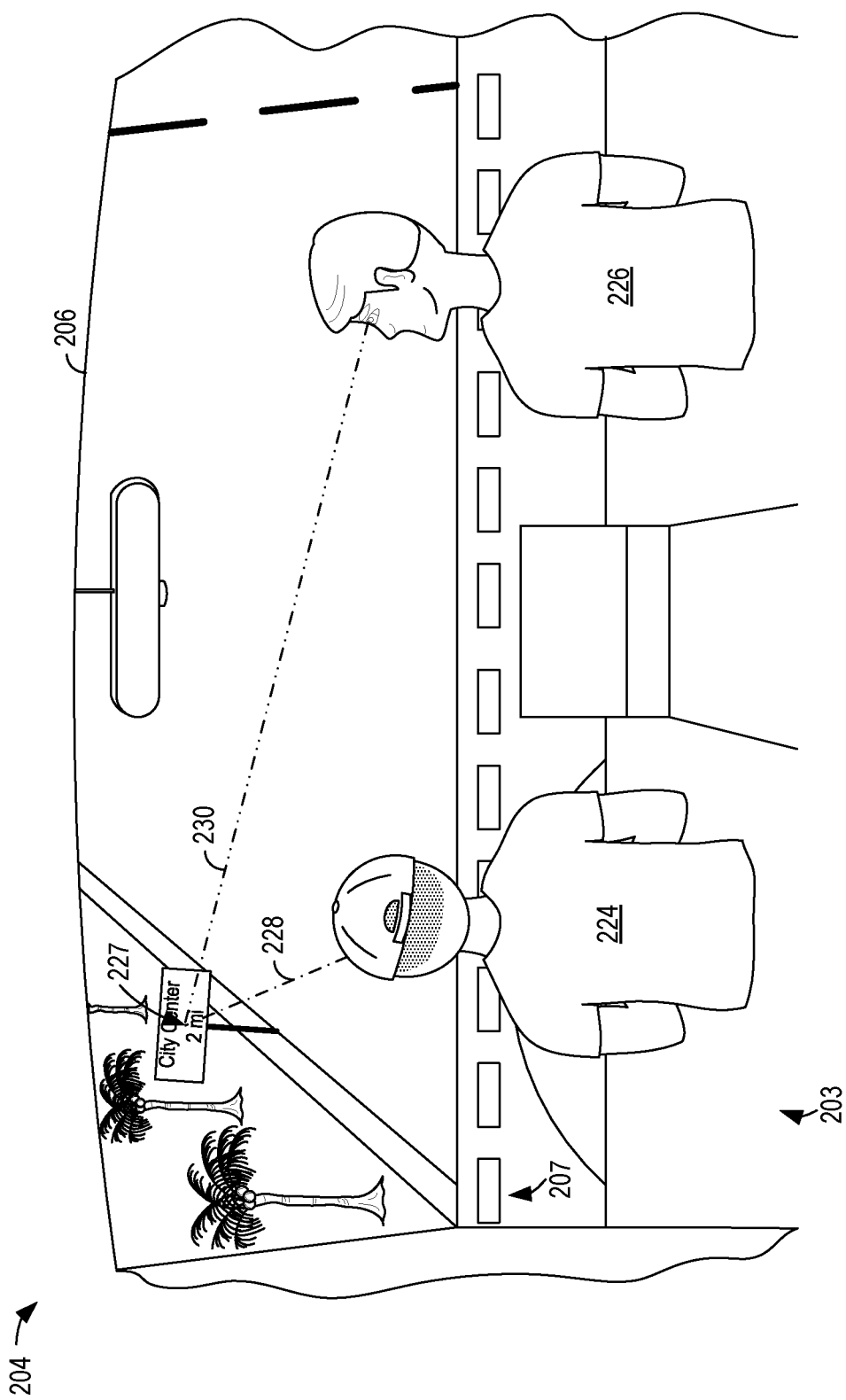
FIGS. 2C-2G show example schematic views of a mirrorless display configuration in a vehicle cabin for projecting images in accordance with one or more embodiments of the present disclosure.

FIGS. 2C-2G schematically show different display scenarios for displaying images on/through the windshield 206 via the display units 207. In FIG. 2C, a view on an interior of the cabin 203 of vehicle 204 is schematically shown from a different rear perspective relative to the cabin 203 as schematically shown in FIG. 2B. In the example of FIG. 2C, the cabin 203 includes two occupants, a first occupant 224 and a second occupant 226. Both occupants may have a user focal point 227 that targets the same object in an environment of the vehicle 204, however due to the different locations of the occupants (and different location of eyes of the occupants, which serve as an origin of the respective gaze paths of the occupants) in the cabin, first occupant 224 may have a first eye gaze path 228 that is different from a second eye gaze path 230 of the second occupant 226. Accordingly, the display units 207 may direct light onto the windshield differently to present an image viewable at the user focal point for the first occupant versus the second occupant.

Figure 2D:
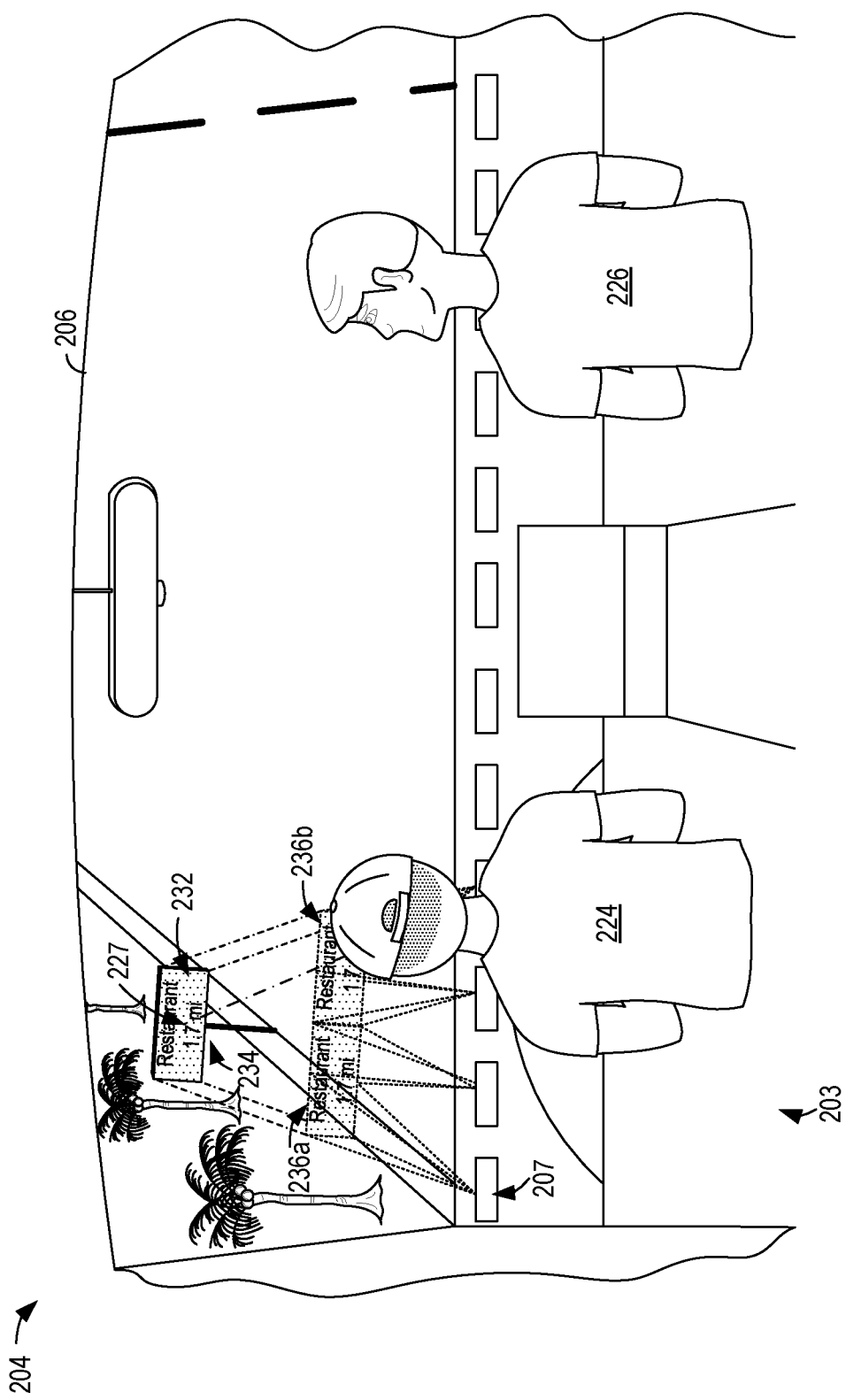
Figure 2E:
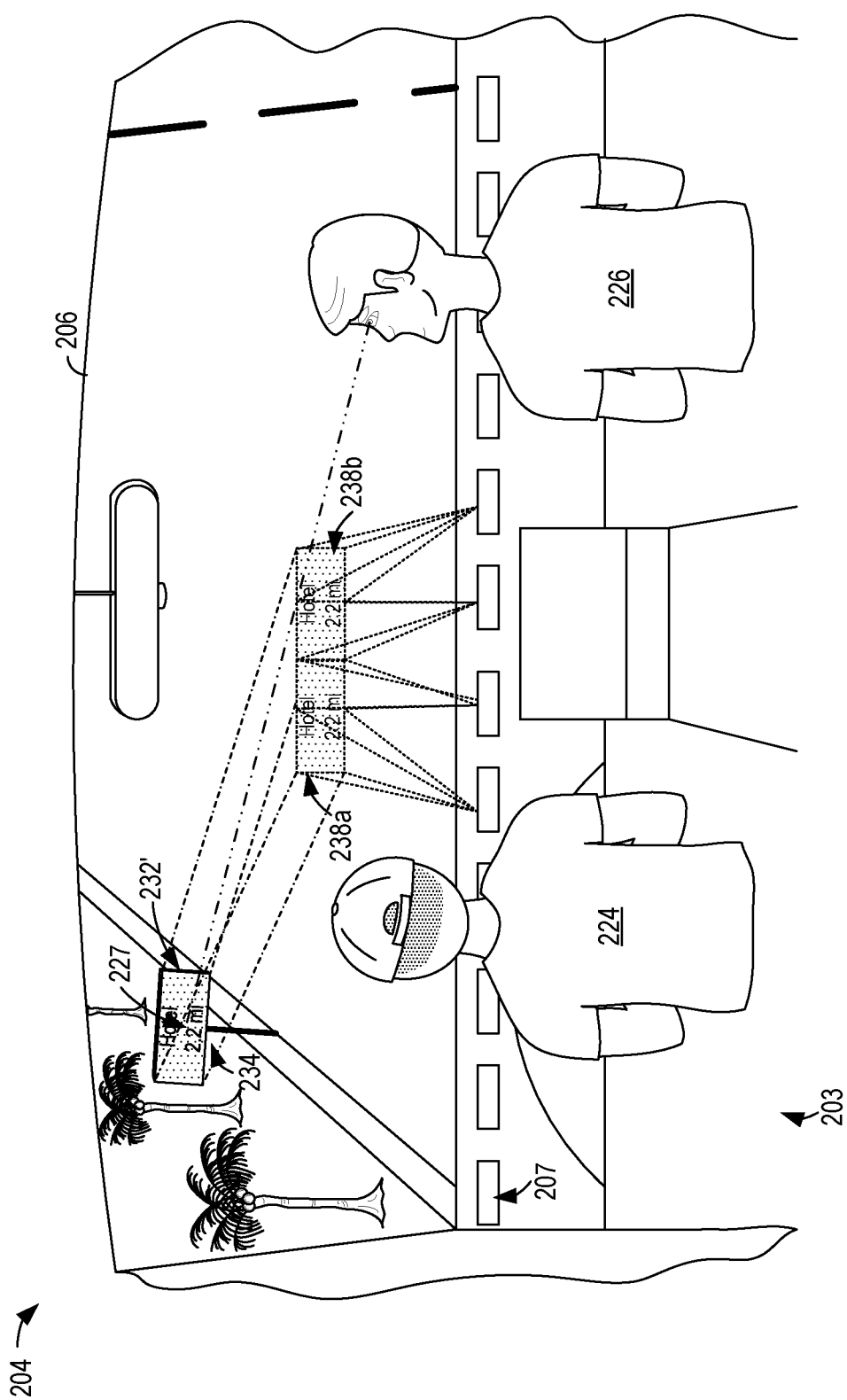

FIG. 2D shows an exemplary projection for overlaying a virtual image 232 on a real-world object, such as a sign 234 using stereoscopic images 236a and 236b. The stereoscopic images 236a and 236b are configured for presenting the virtual image 232 at the user focal point 227 from the perspective of the first occupant 224. In the illustrated example, such positioning is achieved through the coordinated use of the leftmost display units 207. FIG. 2E shows an exemplary projection for overlaying a virtual image 232' on the sign 234 using stereoscopic images 238a and 238b that are configured for presenting the virtual image 232' at the user focal point 227 from the perspective of the second occupant 226. The virtual images may be three-dimensional and customized for the occupants, and thus virtual image 232 may be different from virtual image 232'. For example, the second occupant 226 may be most interested in a distance to a hotel (e.g., based on a request for such information as received from the second occupant and/or based on an examination of recent activity or behaviors of the second occupant, such as a drowsiness level, that indicates an interest in a hotel), while the first occupant 224 may be most interested in a distance to a restaurant (e.g., based on a request for such information as received from the first occupant and/or based on an examination of recent activity or behaviors of the first occupant, such as a time since a last meal, that indicates an interest in a restaurant). Accordingly, the virtual image 232 may include information regarding a distance to a restaurant, while the virtual image 232' may include information regarding a distance to a hotel. Such information targeting may also be useful in taxi or ride share scenarios in which a destination for each occupant is known and related information for respective destinations is presented for each occupant.

Due to the differences in position of the two occupants, the stereoscopic images 238a/b are positioned in a different location than the stereoscopic images 236a/b. In the illustrated example, different display units 207 (e.g., middle display units) are used to project the stereoscopic images 236a/b relative to the units used to project the stereoscopic images 238a/b. In other examples, the same display units may be used to project either set of stereoscopic images, and a directionality of output light and/or other parameter (e.g., selective dimming of backlights for selected display units) may be adjusted to display the stereoscopic images in the different positions. In each example of FIGS. 2D and 2E, the stereoscopic images for the respective occupant are positioned based on the eye position and eye gaze of that respective occupant in order to ensure alignment of the virtual image from the perspective of the respective occupant. By positioning the virtual image based on a location of the eyes and eye gaze of a selected occupant, the projected images may accommodate any occupant of the vehicle, which may be useful in scenarios such as driverless vehicle scenarios in which an occupant may be seated anywhere in the vehicle.

Figure 2F:
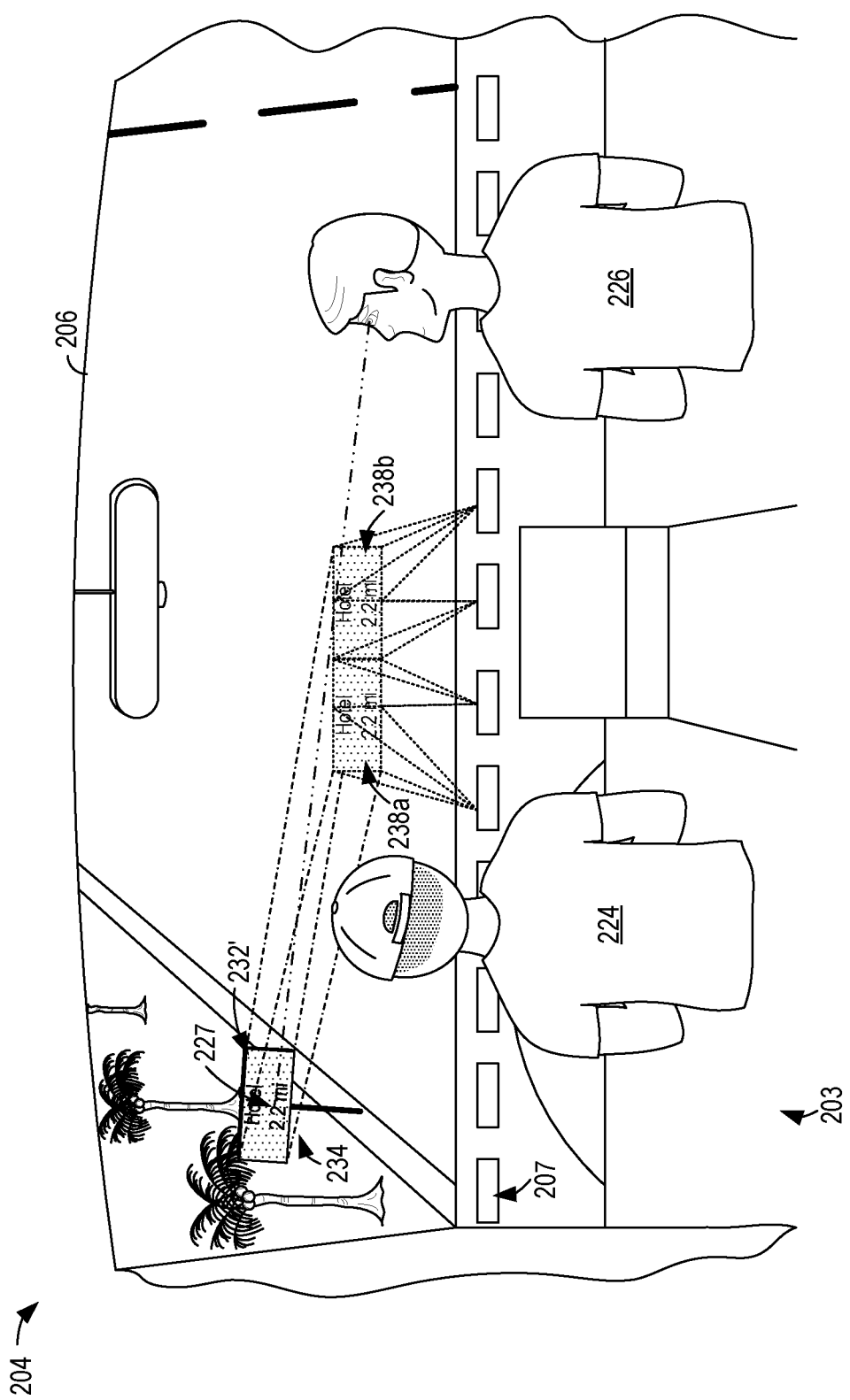

In some examples, the virtual image 232' may be configured to track a position of a real-world object as the real-world object moves in the environment (or as the vehicle moves in relation to the real-world object through the environment). FIG. 2F shows an example of a movement of stereoscopic images 238a/b in order to maintain alignment of the virtual image 232' with the position of the sign 234 as the position of the sign moves relative to the vehicle 204. Accordingly, the relative positioning of the stereoscopic images 238a/b and the sign 234 in FIGS. 2E and 2F may be substantially to scale to show the movement of the sign 234 in the real world and the resulting movement of the stereoscopic images (and resulting virtual image) to maintain alignment with the sign 234 as viewed from the perspective of the second occupant.

Figure 2G:
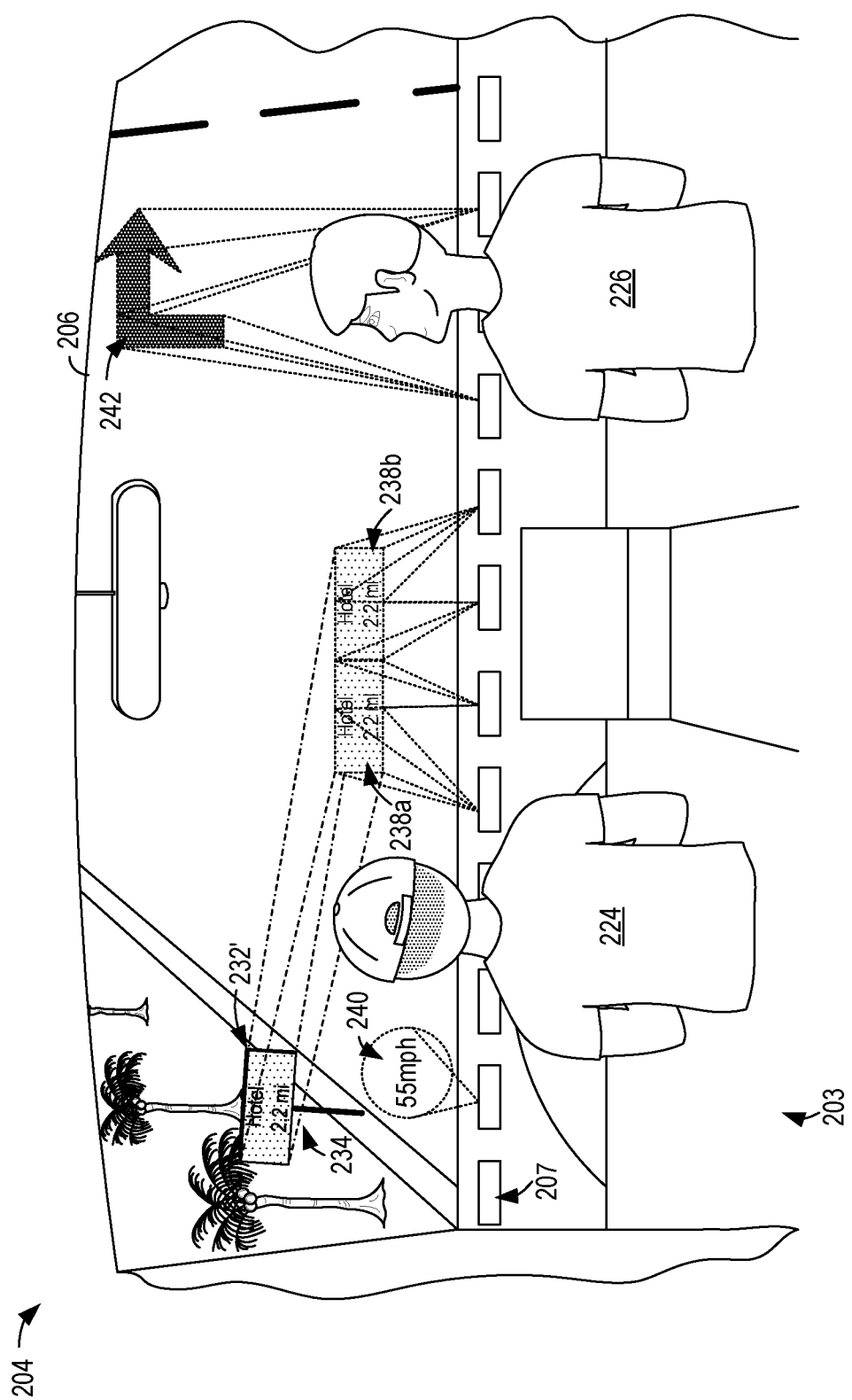

FIG. 2G shows an example scenario in which multiple display units may be used to project multiple images via the windshield 206, enabling a large portion of the windshield 206 (e.g., an entirety of the windshield) to be used as a display surface. For example, in addition to the stereoscope images 238a/b described above with respect to FIG. 2F, another display unit may project a current speed indicator 240 (e.g., a display unit on the left end of the windshield) and still other display units may project a navigation instruction 242 (e.g., display units on the right end of the windshield). The speed indicator 240 and navigation instruction 242 may be displayed in a near-field (e.g., in a different field relative to the virtual image 232'), while the virtual image 232' may be displayed in a far-field. As illustrated, the number of display units used to display a given image may vary. In some examples, the display units used to display various virtual images or indicators on/through the windshield may be greater than the number of virtual images and/or indicators displayed on/through the windshield. In other examples, the same number or fewer display units may be used to display the number of virtual images and/or indicators displayed on/through the windshield. The number of display units used to display a given virtual image or set of virtual images may depend on parameters of the virtual image(s), such as a size, resolution, content, color, etc.

In the illustrated example, the display units 207 are utilized to display the various images via the windshield, however, it is to be understood that the images may be presented using other display arrangements that are disclosed herein. For example, the speed indicator 240 and/or the navigation instruction 240 may be displayed via a see-through display formed by the windshield 206, while the virtual image 232' may be displayed via mirrorless display units 207. In other examples, one or more of the display units 207 may alternatively include other display configurations that are disclosed herein, which may include mirrors in some examples.

Returning to FIG. 2A, the display 208 may be controlled via a display controller 214. The display controller 214 may be a dedicated display controller (e.g., a dedicated electronic control unit that only controls the display) or a combined controller (e.g., a shared electronic control unit that controls the display and one or more other vehicle systems). In some examples, the display controller may be a head unit of the vehicle 204 (e.g., an infotainment unit and/or other in-vehicle computing system). The display controller may include memory and a processor for executing instructions stored in the memory to control an output of the display 208. The display controller 214 may control the display 208 to project particular images based on the instructions stored in memory and/or based on other inputs. The display controller 214 may also control the display 208 to selectively turn off (e.g., dim) portions of backlighting from the backlight array 209 to conserve power and/or reduce heat based on a state of the display and/or ambient conditions of the display. For example, when regions of an image are black, portions of the backlight array 209 corresponding to the locations of the black regions of the images may be turned off. As another example, if a thermal load is predicted or detected to be above a threshold, selected light sources of the backlight array 209 may be turned off to reduce heat generation (e.g., alternating light sources in the array may be switched off so that the whole image may be displayed while only half of the light sources are generating heat, or the image may be reduced in size and light sources in the array corresponding to locations of newly black regions of the image may be turned off). Examples of inputs to the display controller 214 to control mechanism of display 208 include an eye tracking module 216, a sunload monitoring module 218, a user input interface 220, and a vehicle input interface 222.

Eye tracking module 216 may include and/or be in communication with one or more image sensors to track movement of eyes of a user (e.g., a driver). For example, one or more image sensors may be mounted in a cabin of the vehicle 204 and positioned to capture (e.g., continuously) images of pupils or other eye features of a user in the vehicle. In some examples, the image data from the image sensors tracking the eyes may be sent to the display controller for processing to determine a gaze direction and/or other eye tracking details. In other examples, the eye tracking module 216 may include and/or may be in communication with one or more processing modules (e.g., local modules within the vehicle, such as a processing module of a head unit of the vehicle, and/or remote modules outside of the vehicle, such as a cloud-based server) configured to analyze the captured images of the eyes and determine the gaze direction and/or other eye tracking details. In such examples, a processed result indicating a gaze direction and/or other eye tracking information may be sent to the display controller. The eye tracking information, whether received by or determined at the display controller, may be used by the display controller to control one or more display characteristics. The display characteristics may include a location of display data (e.g., to be within a gaze direction), localized dimming control (e.g., dimming backlighting in regions that are outside of a gaze direction), a content of display data (e.g., using the gaze direction to determine selections on a graphical user interface and rendering content corresponding to the selections on the graphical user interface), and/or other display characteristics. In some examples, other eye tracking data may be used to adjust the display characteristics, such as adjusting a visibility (e.g., opacity, size, etc.) of displayed data responsive to detection of a user squinting.

Sunload monitoring module 218 may include and/or be in communication with one or more sun detection sensors, such as infrared sensors, to determine an amount of sunlight (or other light) impinging on the windshield and/or display elements. As described above with respect to the image sensors and eye tracking data, sunload monitoring data may be processed locally (e.g., by the sunload monitoring module 218, by the display controller 214, and/or by another in-vehicle processing module, such as a processing module of a head unit of the vehicle 204), remotely (e.g., by a remote service outside of the vehicle, such as a cloud-based server), and/or some combination thereof. The sunload monitoring data may include an amount of sunlight (or other light) in a given region of the vehicle that is associated with the display configuration (e.g., display units, regions of the windshield onto which display light from the display 208 may be projected, other locations in a path of light emitted from the display 208, etc.). The amount of light may be compared to one or more thresholds and used by the display controller

214 to adjust one or more display characteristics. For example, if sunload in a particular region of the windshield is above a threshold, the display controller and/or another suitable controller may adjust a physical position of an optical element (e.g., the 3D element 212) to increase a focal length of the display configuration and reduce a magnification of the optics of the display configuration, thereby decreasing a sunload on the display elements (e.g., a thin-film-transistor, TFT, of an LCD display).

The user input interface 220 and vehicle input interface 222 may be used to provide instructions to the display controller 214 to control the display based on user input and vehicle data/status, respectively. For example, user input to change a type of information displayed (e.g., to select between instrument data such as speed/RPM/etc. and navigation data such as turn directions), to select options when a graphical user interface is displayed, and/or to otherwise indicate user preferences may be provided to the display controller 214 and processed to alter a content and/or format of the data displayed via the display configuration 202. The user input interface may receive user input from any suitable user input device, including but not limited to a touch screen, vehicle-mounted actuators (e.g., buttons, switches, knobs, dials, etc.), a microphone (e.g., for voice commands), an external device (e.g., a mobile device of a vehicle occupant), and/or other user input devices. The vehicle input interface 222 may receive data from vehicle sensors and/or systems indicating a vehicle status and/or other vehicle data, which may be sent to the display controller 214 to adjust content and/or format of the data displayed via the display configuration 202. For example, a current speed may be supplied (e.g., via a controller-area network, CAN, bus of the vehicle) to the vehicle input interface and sent to the display controller to update a display of a current speed of the vehicle. The vehicle input interface may also receive input from a navigation module of a head unit of the vehicle and/or other information sources within the vehicle.

Figure 3:
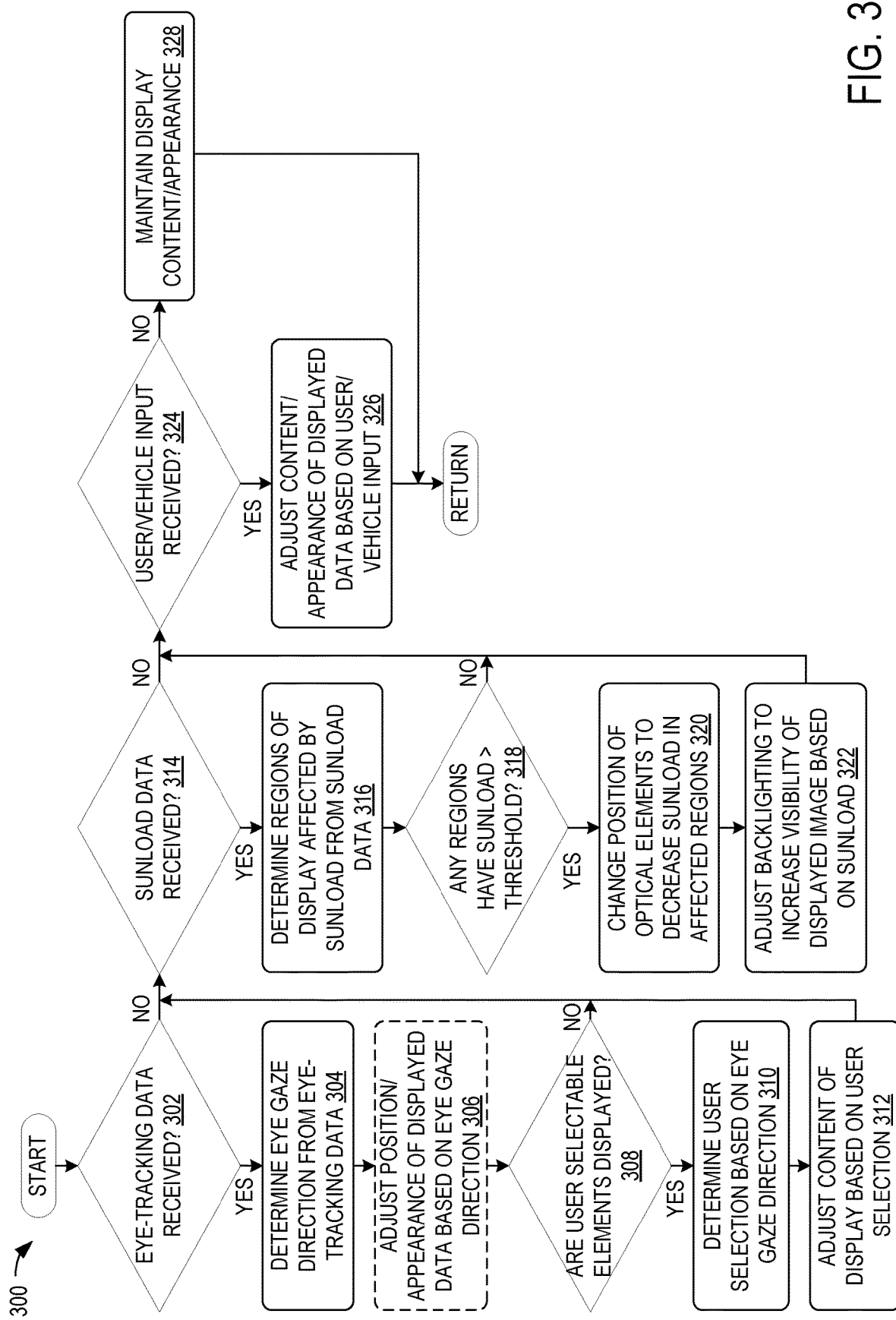
FIG. 3 shows an example flow chart of a method for adjusting a display in accordance with one or more embodiments of the present disclosure.

FIG. 3 is a flow chart of an example method 300 of controlling a display based on eye tracking, sunload, user input, and/or vehicle input. Method 300 may be performed by a display controller, such as display controller 214 of FIG. 2A, in correlation with other devices, such as eye tracking module 216, sunload monitoring module 218, user input interface 220, and vehicle input interface 222 of FIG. 2A. At 302, the method includes determining if eye-tracking data is received. If eye-tracking data is received (e.g., "YES" at 302), the method includes determining an eye gaze direction from the eye-tracking data, as indicated at 304. Optionally, the method further includes adjusting a position and/or appearance of displayed data based on the eye gaze direction, as indicated at 306. For example, a position of displayed data may be adjusted to align with an eye gaze direction. As another example, displayed content may be decreased and/or lightened (e.g., reducing an output of a display) when an eye gaze direction is not aligned with a position of the displayed data (e.g., when a viewer looks away from the displayed data, the displayed data may be decreased to conserve power resources).

At 308, the method includes determining if user selectable elements are displayed. If user selectable elements are displayed (e.g., "YES" at 308), the method includes determining a user selection based on the eye gaze direction, as indicated at 310. For example, the eye gaze direction may be compared to a location of displayed elements in a field of view of the user to determine with which (if any) selectable items the gaze of the user intersects. At 312, the method includes adjusting content of the display based on the user selection. For example, different displayed information may be presented responsive to user input selecting a different view.

Upon adjusting content, or if no user selectable elements are displayed (e.g., "NO" at 308), or if eye-tracking data is not received (e.g., "NO" at 302), the method includes determining whether sunload data is received, as indicated at 314. If sunload data is received (e.g., "YES" at 314), the method includes determining, from the sunload data, regions of the display affected by sunload, as indicated at 316. At 318, the method includes determining if any regions have sunload that is above a threshold. If one or more regions of the display have a sunload that is above the threshold (e.g., "YES" at 318), the method includes changing a position of optical elements to decrease sunload in the affected regions (e.g., the one or more regions with sunload above the threshold), as indicated at 320. At 322, the method includes adjusting a backlighting to increase visibility of the displayed image based on sunload. For example, a brightness or contrast of imagery in the regions with above the threshold amount of sunload may be increased to increase visibility of these regions of the display.

Upon adjusting the display to counteract sunload, or if no regions have a sunload that is above the threshold (e.g., "NO" at 318), or if sunload data is not received (e.g., "NO" at 314), the method includes determining if user or vehicle input is received, as indicated at 324. If user or vehicle input is not received (e.g., "NO" at 324), the method may include maintaining a display content and/or appearance (e.g., not changing the display), as indicated at 328. If user or vehicle input is received (e.g., "YES" at 324), the method includes adjusting content and/or appearance of displayed data based on the user and/or vehicle input, as indicated at 326. For example, the displayed data may be adjusted to register a user input selecting a menu option (e.g., as described above at 312) and/or to satisfy a user preference (e.g., where the user may specify an increase in display size, or another change in display appearance, or where the user may specify a different display mode, a display shut down, etc.). As another example, the displayed data may be adjusted to output an updated vehicle parameter (e.g., a vehicle speed, engine RPM, etc.) responsive to data from the vehicle indicating the vehicle parameter. The user/vehicle input may also include a user/vehicle status that reflects a user workload or environmental condition that is used to change a parameter of the displayed data. For example, responsive to indications from a user (e.g., stress detection) and/or from the vehicle (e.g., obstacle detection, increased traffic, difficult navigation maneuvers, inclement weather conditions, etc.), the displayed data may be adjusted to assist the user in concentrating on driving tasks (e.g., the displayed data may be reduced in size/brightness, the displayed data may be moved to a less prominent location such as a far side of the windshield, the displayed data may be temporarily turned off, etc.). Likewise, after determining that driving conditions and/or user status has returned to a state in which a heads up display may not be distracting (e.g., reduced traffic, disappearance of obstacle, passing difficult navigation maneuvers, clearing weather, etc.), the displayed data may be returned to a previous location and/or appearance, and/or may be turned back on.

Figure 4:
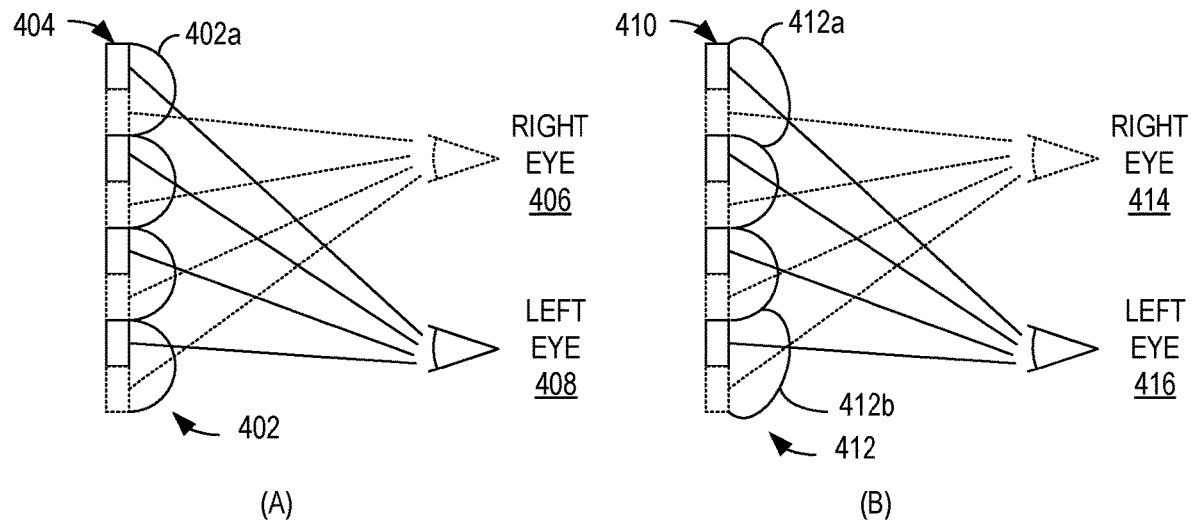
FIG. 4 shows example lenticular lens constructions in accordance with one or more embodiments of the present disclosure.

A three-dimensional element of a display configuration, such as 3D element 212 of FIG. 2A, may be configured to correct for field curvature (e.g., correct aberration that occurs due to the field curvature) that is present in some environments (e.g., vehicle environments, in which images are displayed via/through a curved windshield). FIG. 4 shows an example adjustment to a prescription of a lenticular lens to counteract field curvature and sharpen image edges in a far field of an image space. Configuration (A) of FIG. 4 shows an example cross-sectional view of a lenticular lens configuration in which each component (e.g., cylindrical lens) of the lens construction is substantially identical. A stereoscopic effect is produced as the array of cylindrical lenses (e.g., including cylindrical lens 402a) of lenticular lens 402 directs light from alternate pixel columns 404 to a defined viewing zone, allowing each eye (e.g., right eye 406 and left eye 408) to receive a different image.

Configuration (B) of FIG. 4 operates according to the same principle as configuration (A), and includes a pixel column 410 and lenticular lens 412 to direct light toward a right eye 414 and a left eye 416. However, in configuration (B), edge cylindrical lenses 412a and 412b are oriented differently than the other cylindrical lenses in the array forming lenticular lens 412. Accordingly, a radius of the outer/edge cylindrical lenses is different from the radius of the inner cylindrical lenses. The adjusted orientation of the edge lenses may curve the displayed image plane to counteract curvature in a far field of view.

Furthermore, as the disclosed display systems utilize additional optics for providing three-dimensional images, the final image has a resolution that is halved relative to the input image. In order to accommodate this downsize in resolution, the resolution of the displays in the described examples may be doubled, the amount of backlight used to illuminate the displays in the described examples may be increased, and the properties of the display may be adjusted based on a thermal state of the components (e.g., reducing backlighting if overheating is detected or predicted based on environmental conditions such as sunlight directed toward the optical elements of the display).

Figure 5:
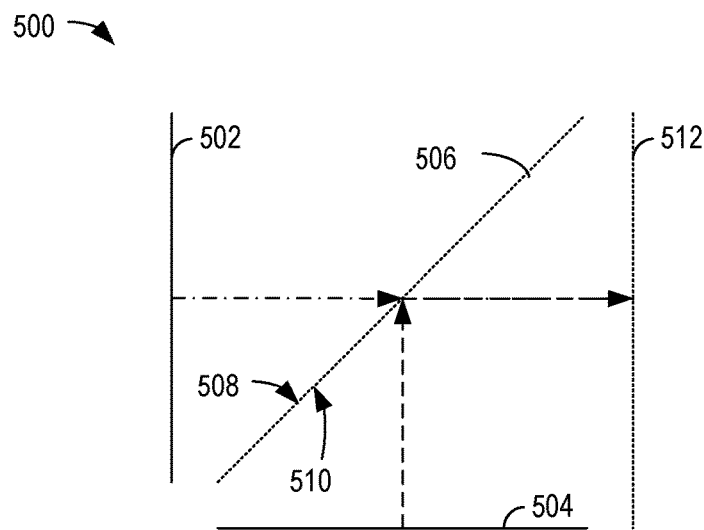
FIG. 5 shows an example multi-plane display configuration in accordance with one or more embodiments of the present disclosure.

The disclosure also provides for displaying information using multiple plane projections, such as multiple two-dimensional overlapping planes in space. For example, two different image generation devices may be embedded in a vehicle or other environment to provide a heads up display that overlays image information at different distances. FIG. 5 shows an example display configuration 500 in which a first display 502 may be used to provide a first, near-field image and a second display 504 may be used to provide a second, far-field image (or vice versa). The first and second display may each include LCD transmissive displays in some examples. In the illustrated example, the first and second displays are positioned at approximately 90 degrees relative to one another. The first and second displays may be positioned to enable polarized light at specific angles to enable reflection at Brewster's angles. Each of the first display 502 and the second display 504 may transmit light toward a mirror 506, which may be configured to transmit light arriving at a first surface (e.g., a first display-side surface 508) and to reflect light arriving at a second surface (e.g., a second display-side surface 510). In this way, light from each of the first and second displays may be directed toward a light adjusting element 512, which may include a waveplate (e.g., a quarter waveplate) or a retardation film (e.g., to allow for viewing through sunglasses by compensating for polarization provided by the sunglasses). The light adjusting element 512 and/or one or more other optical elements (e.g., a lens system) may be used to shift planes of the light from the first and second displays, respectively, such that light from the first display appears in a near-field and light from the second display appears in a far field (e.g., a farther field than the near-field).

In some additional or alternative examples, multiple planes may be created by using chromatic films that perform dense spectral combining to create multiple images by allowing certain light to pass through while reflecting others, thereby allowing overlapping imagery in three-dimensional space. As another example, a display configuration may include lasers that create multiple holographic sheets to produce the multiple image plane effect.

As another example, multiple near and far plane projections may be created using a transparent organic light emitting diode (OLED) as windshield glass (e.g., windshield 206 of FIG. 2A) or embedding a photo-sensitive material in windshield glass to produce a near-plane image and using LCD or MEMS-based projection (e.g., using any of the above-described projection examples) to produce a far-plane image. The above example constructions allow for multiple image planes to be produced without using high volume and/or high profile projection systems. Furthermore, the above example constructions have reduced power consumption relative to other constructions.

In the above-described examples of producing images in multiple planes, associated displays may be controlled to produce different images that benefit from the different plane distances. For example, near-plane images may be controlled to be images that benefit from increased sharpness and stability, such as images that are able to remain in a relatively static position relative to the viewer/vehicle, even as the environment moves. As a detailed example, near-plane images may include vehicle status information and/or instrument panel type display data, such as a vehicle speed, vehicle warnings/alerts (e.g., oil level, temperature, maintenance reminders, diagnostic code warnings, etc.), engine RPM, tachometer information, remaining fuel level/estimated distance that can be traveled on the remaining fuel, notifications (e.g., from a connected mobile device, such as incoming communications), current time, radio/audio information (e.g., current radio station, currently-played song, etc.), graphical user interface controls, and/or other display elements. Far-plane images may be controlled to be images that benefit from interaction with the surrounding environment (e.g., images that are world-locked, or maintain a same position relative to the surrounding environment to augment the surrounding environment). For example, far-plane images may include navigation directions (e.g., which may be overlaid on a road surface, road sign, other vehicle, etc. and move relative to a viewer to maintain a static relationship with the environmental feature over which the display data is laid), informational displays identifying or providing status information for environmental features, and/or other displayed data. The above-described near- and far-plane images may be produced in different continuous planes, such that the images in the near-plane occupy a first, closer range of depths and the images in the far-plane occupy a second, farther range of depths. As a non-limiting example, images in the near-plane may be positioned to appear to a user to be within a range of 5 meters to 25 meters away from the user, and images in the far-plane may be positioned to appear to the user to be within a range of 26 meters to 75 meters away from the user.

Figure 6:
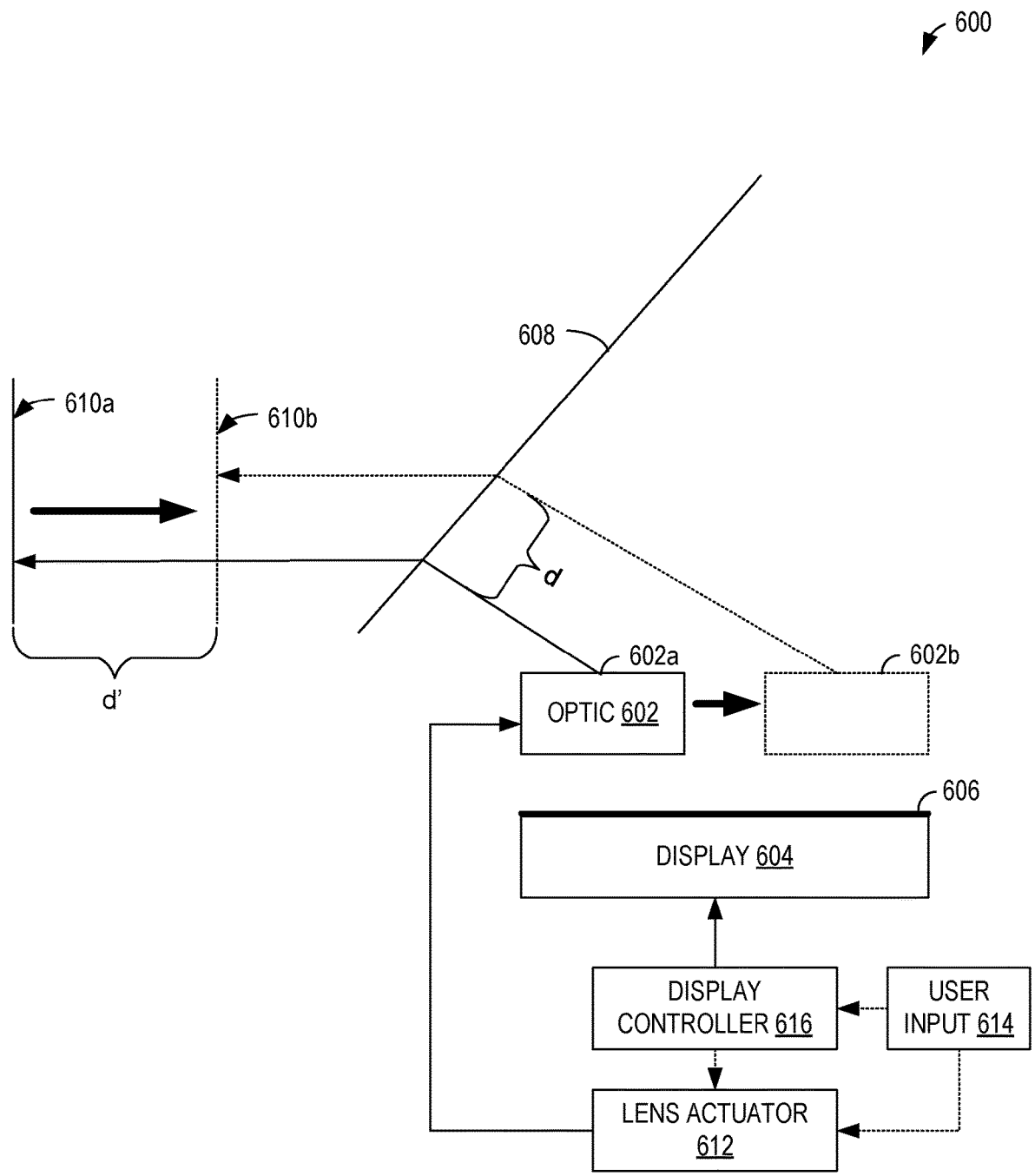
FIG. 6 shows an example display configuration with adjustable optics in accordance with one or more embodiments of the present disclosure.

FIG. 6 shows an example display configuration 600 including a movable optic 602 that is moveable to adjust a position or depth of field of displayed data. The configuration of FIG. 6 is similar to the configuration of FIG. 2A, however it is to be understood that the movable optic 602 may be incorporated into any suitable display configuration, including the other configurations disclosed herein. Display configuration 600 includes a display 604, which may be an LCD, DLP MEMS, or other display technology. The display 604 may be covered with and/or may direct light through a 3D element 606, such as a lenticular lens or parallax barrier to produce a three-dimensional image that is passed through the movable optic 602. The movable optic 602 may include an adjustable lens or array of lenses (e.g., zoom optics) that is positioned over the display (and over the 3D element). As shown, when the movable optic 602 is in position 602a, image light from the display 604 may be transmitted through a windshield 608 to produce an image at a first depth of field indicated at 610a. Responsive to moving the movable optic to position 602b, image light from the display 604 may be transmitted through the windshield 608 to produce the image at a second depth of field indicated at 610b. Accordingly, responsive to moving the movable optic in space, which results in the change of distance or angle of the light impinging on the windshield as indicated at d, the depth of field of the displayed image may be adjusted to be nearer or farther from the windshield/viewer, the change of distance of the depth of field being shown at d'.

The movable optic may be controlled via a lens actuator 612 responsive to user input from a user input device 614 and/or responsive to instructions from a display controller 616 (which may also be controlled at least in part by user input from user input device 614). The display controller 616 may control an output of the display 604 (e.g., as described above with respect to the display controller 214 of FIG. 2A). The lens actuator 612 may include one or more components to physically move the movable optic 602 to change a physical location of the movable optic within the display configuration. Although FIG. 6 shows a lateral movement (e.g., maintaining a same distance from the display, and changing a lateral position relative to the display) in the illustrated example, it is to be understood that the movable optic 602 may be moved in any suitable manner, including movements along a direction of light emitted from the display (e.g., changing a distance between the optic and the display) and changes in orientation of the optic relative to the display.

In any of the above examples of display systems/configurations, multiple displays may be used to output image light for generating a three-dimensional image. The multiple displays may include one or more arrays of one or more displays. The displays and/or arrays may include displays having different strengths or characteristics in some examples. For example, the display systems may include at least one organic light-emitting diode (OLED) display and at least one liquid crystal display (LCD) in order to take advantages of the relative strengths of the displays. The OLED display(s) may be primarily enabled (e.g., instead of LCD displays) during low ambient light conditions and/or conditions where a high contrast ratio is desired. The LCD display(s) may be primarily enabled (e.g., instead of OLED displays) during high ambient light conditions and/or conditions where a high level of brightness is desired. As a detailed, non-limiting example, only the LCD displays in a display system may be enabled or more LCD displays than other displays in the display system may be enabled when the display system detects above a threshold amount of ambient light (e.g., above 500 nits). When the display system detects below the threshold amount of ambient light, only the OLED displays in the display system may be enabled or more OLED displays than other displays in the display system may be enabled. In some examples, different displays may be enabled or disabled by controlling backlighting that is supplied to the displays (e.g., by turning off portions of a matrix of backlight light sources that correspond to displays selected to be disabled and/or turning on portions of the matrix of backlight light sources that correspond to displays selected to be enabled).

The disclosure provides for a mirrorless heads up display device including a display, at least one micro lens array, an optical element comprising a lenticular lens or parallax barrier positioned between the display and the at least one micro lens array, and a display controller comprising a processor and memory storing instructions executable by the processor to control the display to output image light that passes through the lenticular lens or parallax barrier and the at least one micro lens array and impinges on a transparent plane to form a three-dimensional image. In a first example, the image light from the display may additionally or alternatively be directed to generate the three-dimensional image on the transparent plane without being reflected by any mirror. A second example optionally includes the first example, and further includes the mirrorless heads up display device, wherein the display controller is included in a head unit of a vehicle, and wherein the transparent plane is a windshield of the vehicle. A third example optionally includes one or both of the first example and the second example, and further includes the mirrorless heads up display device, further comprising an array of backlight light sources distributed as a matrix along a back of the display. A fourth example optionally includes one or more of the first example through the third example, and further includes the mirrorless heads up display device, wherein the array of backlight light sources includes a matrix of individually-controllable light-emitting diodes. A fifth example optionally includes one or more of the first example through the fourth example, and further includes the mirrorless heads up display device, wherein the instructions are further executable to selectively turn off or dim one or more of the light-emitting diodes of the matrix based on a content of the three-dimensional image and/or dynamic conditions of the mirrorless heads up display device. A sixth example optionally includes one or more of the first example through the fifth example, and further includes the mirrorless heads up display device, wherein the dynamic conditions of the mirrorless heads up display device includes an amount of sunlight in a particular region of the transparent plane. A seventh example optionally includes one or more of the first example through the sixth example, and further includes the mirrorless heads up display device, wherein the dynamic conditions of the mirrorless heads up display device includes a location of an eye gaze of a user, and wherein the instructions are executable to turn off or dim the light-emitting diodes of the matrix that are configured to illuminate regions of the display that generate regions of the three-dimensional image that are a threshold distance away from the location of the eye gaze of the user. An eighth example optionally includes one or more of the first example through the seventh example, and further includes the mirrorless heads up display device, wherein the lenticular lens comprises an array of cylindrical lenses, and wherein a radius of one or more edge cylindrical lenses of the array have a different radius than one or more other cylindrical lenses of the array. A ninth example optionally includes one or more of the first example through the eighth example, and further includes the mirrorless heads up display device, wherein the at least one lens array includes a zoom lens that is movable relative to the display to change a depth of field of the mirrorless heads up display device.

The disclosure also provides for a method for operating a mirrorless heads up display device, the method including controlling a display of the heads up display device to output image light that passes through an optical element and at least one micro lens array and impinges on a transparent plane to form a three-dimensional image without reflecting the image light by a mirror, the three-dimensional image being generated on a continuous plane. In a first example, the method may additionally or alternatively further comprise selectively turning off or dimming one or more individually-controllable light-emitting diodes of a backlight matrix distributed at a back of the display based on one or more dynamic conditions of the heads up display device. A second example optionally includes the first example, and further includes the method, wherein the one or more dynamic conditions of the heads up display device includes a location of an eye gaze of a user of the heads up display device and/or an amount of sunlight impinging on the transparent plane. A third example optionally includes one or both of the first example and the second example, and further includes the method, wherein a focal point of the three-dimensional image is dynamically changed to create the continuous plane at a location of a user focal point identified by a gaze-tracking sensor.

The disclosure also provides for a mirrorless heads up display device for a vehicle, the mirrorless heads up display device including a display, at least one micro lens array distributed across a windshield of the vehicle, a gaze-tracking module configured to receive gaze-tracking data indicating a user focal point of a user of the mirrorless heads up display, an optical element comprising a lenticular lens or parallax barrier positioned between the display and the at least one micro lens array, and a display controller comprising a processor and memory storing instructions executable by the processor to control the display to output image light that passes through the lenticular lens or parallax barrier and the at least one micro lens array and impinges on the windshield to form a three-dimensional image without reflecting the image light by any mirror, a focal point of the three-dimensional image being dynamically changed to create a continuous plane based on the user focal point. In a first example, the mirrorless heads up display device may additionally or alternatively further comprise an array of backlight light sources distributed as a matrix of individually-controllable light-emitting diodes along a back of the display. A second example optionally includes the first example, and further includes the mirrorless heads up display device, wherein the instructions are further executable to selectively turn off or dim one or more of the individual-controllable light-emitting diodes based on a content of the three-dimensional image and/or a dynamic condition of the mirrorless heads up display. A third example optionally includes one or both of the first example and the second example, and further includes the mirrorless heads up display device, wherein the instructions are further executable to selectively turn off or dim one or more of the individually-controllable light-emitting diodes based on the user focal point. A fourth example optionally includes one or more of the first example through the third example, and further includes the mirrorless heads up display device, wherein the lenticular lens comprises an array of cylindrical lenses, and wherein a radius of one or more edge cylindrical lenses of the array have a different radius than one or more other cylindrical lenses of the array. A fifth example optionally includes one or more of the first through the fourth examples, and further include the mirrorless heads up display device, wherein the windshield further comprises a transparent organic light emitting diode (OLED) display or a photo-sensitive material to produce a near-plane image, and wherein the display is configured to produce a far-plane image, the far-plane image being positioned farther in a visual field of view of a viewer than the near-plane image.

The above-described examples include display configurations that include one or more features to have the technical effect of decreasing a packaging size (e.g., by providing a mirrorless three-dimensional display configuration), decreasing a power consumption (e.g., by selectively dimming backlighting), decreasing a thermal load (e.g., by controlling the spacing of components and reducing backlighting), and/or increasing a user experience (e.g., increasing user comfort by adjusting a depth of field of displayed images) relative to other display configurations. In some examples, output images may be transformed relative to images output by other display configurations to better integrate with an environment (e.g., using continuous plane displays or projections) and/or to improve image quality (e.g., adjusting a radius of portions of a lenticular lens). Furthermore, the use of micro lens arrays to transform a windshield or other large transparent plane into a display surface as described above enables a field of view of a resulting display to be increased without affecting image fidelity.

In another representation, the disclosure provides for a mirrorless heads up display device. In a first example, the mirrorless heads up display device may include a display, at least one micro lens array, a lenticular lens or parallax barrier positioned between the display and the at least one micro lens array, and a transparent plane onto which image light from the display that passes through the lenticular lens or parallax barrier and the at least one micro lens array impinges. As the mirrorless heads up display device may not include any mirrors, light from the display may generate an image without being reflected by any mirror.

A second example of the mirrorless heads up display device optionally includes the first example, and further includes the display device, wherein the transparent plane is a windshield of a vehicle and wherein the display is controlled via a display controller of the vehicle. A third example of the mirrorless heads up display device optionally includes one or both of the first and second examples, and further includes the display device, wherein the display controller is included in a head unit of the vehicle. A fourth example of the mirrorless heads up display device optionally includes one or more of the first through the third examples, and further includes the display device, wherein the lenticular lens comprises an array of cylindrical lenses, and wherein a radius of one or more edge cylindrical lenses of the array have a different radius than one or more other cylindrical lenses of the array.

A fifth example of the mirrorless heads up display device optionally includes one or more of the first through the fourth examples, and further includes the display device, wherein the transparent plane further comprises a transparent organic light emitting diode (OLED) display or a photo-sensitive material to produce a near-plane image, and wherein the display is configured to produce a far-plane image, the far-plane image being positioned farther in a visual field of view of a viewer than the near-plane image. A sixth example of the mirrorless heads up display device optionally includes one or more of the first through the fifth examples, and further includes the display device, wherein the near-plane image comprises an instrument display indicating vehicle status information and wherein the far-plane image comprises navigation information. A seventh example of the mirrorless heads up display device optionally includes one or more of the first through the sixth examples, and further includes the display device, wherein the near-plane image is controlled to be viewer-locked and maintains a position relative to the viewer, and wherein the far-plane image is controlled to be world-locked and moves relative to the viewer as an environment of the viewer moves.

An eighth example of the mirrorless heads up display device optionally includes one or more of the first through the seventh examples, and further includes the display device, wherein the lenticular lens or parallax barrier is movable responsive to user input. A ninth example of the mirrorless heads up display device optionally includes one or more of the first through the eighth examples, and further includes the display device, wherein the at least one lens array includes a zoom lens that is movable relative to the display to change a depth of field of the mirrorless display device.

A tenth example of the mirrorless heads up display device optionally includes one or more of the first through the ninth examples, and further includes the display device, wherein the display includes a backlight formed of an array of lighting elements that are individually controllable, the mirrorless display device further comprising a display controller operable to selectively dim one or more lighting elements of the array of lighting elements. An eleventh example of the mirrorless heads up display device optionally includes one or more of the first through the tenth examples, and further includes the display device, wherein the one or more lighting elements of the array are selected to be dimmed responsive to input from one or more of an eye-tracking module and a sunload module, the eye-tracking module including an imaging device configured to image eyes of a user, and the sunload module including an infrared sensor configured to detect an amount of sunlight in a particular region. A twelfth example of the mirrorless heads up display device optionally includes one or more of the first through the eleventh examples, and further includes the display device, wherein the lenticular lens or parallax barrier is controlled to move responsive to detection of an amount of sunlight in a particular region that is greater than a threshold.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the display controller 214 described with reference to FIG. 2a. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A mirrorless heads up display device comprising:
a display;
at least one micro lens array;
an optical element comprising a lenticular lens or parallax barrier positioned between the display and the at least one micro lens array;
a display controller comprising a processor and memory storing instructions executable by the processor to control the display to output image light that passes through the lenticular lens or parallax barrier and the at least one micro lens array and impinges on a transparent plane to form a three-dimensional image; and
an array of backlight light sources distributed as a matrix along a back of the display.

2. The mirrorless heads up display device of claim 1, wherein the image light from the display is directed to generate the three-dimensional image on the transparent plane without being reflected by any mirror.

3. The mirrorless heads up display device of claim 1, wherein the display controller is included in a head unit of a vehicle, and wherein the transparent plane is a windshield of the vehicle.

4. The mirrorless heads up display device of claim 1, wherein the array of backlight light sources includes a matrix of individually-controllable light-emitting diodes.

5. The mirrorless heads up display device of claim 4, wherein the instructions are further executable to selectively turn off or dim one or more of the light-emitting diodes of the matrix based on a content of the three-dimensional image and/or dynamic conditions of the mirrorless heads up display device.

6. The mirrorless heads up display device of claim 4, wherein the dynamic conditions of the mirrorless heads up display device includes an amount of sunlight in a particular region of the transparent plane.

7. The mirrorless heads up display device of claim 4, wherein the dynamic conditions of the mirrorless heads up display device includes a location of an eye gaze of a user, and wherein the instructions are executable to turn off or dim the light-emitting diodes of the matrix that are configured to illuminate regions of the display that generate regions of the three-dimensional image that are a threshold distance away from the location of the eye gaze of the user.

8. The mirrorless heads up display device of claim 1, wherein the lenticular lens comprises an array of cylindrical lenses, and wherein a radius of one or more edge cylindrical lenses of the array have a different radius than one or more other cylindrical lenses of the array.

9. The mirrorless heads up display device of claim 1, wherein the at least one micro lens array includes a zoom lens that is movable relative to the display to change a depth of field of the mirrorless heads up display device.

10. A method for operating a mirrorless heads up display device, the method comprising:
controlling a display of the heads up display device to output image light that passes through an optical element and at least one micro lens array and impinges on a transparent plane to form a three-dimensional image without reflecting the image light by a mirror, the three-dimensional image being generated on a continuous plane; and selectively turning off or dimming one or more individually-controllable light-emitting diodes of a backlight matrix distributed at a back of the display based on a content of the three-dimensional image and/or one or more dynamic conditions of the heads up display device.

11. The method of claim 10, wherein the one or more dynamic conditions of the heads up display device includes a location of an eye gaze of a user of the heads up display device and/or an amount of sunlight impinging on the transparent plane.

12. The method of claim 10, wherein a focal point of the three-dimensional image is dynamically changed to create the continuous plane at a location of a user focal point identified by a gaze-tracking sensor.

13. A mirrorless heads up display device for a vehicle, the mirrorless heads up display device comprising:
   a display;
   at least one micro lens array distributed across a windshield of the vehicle;
   a gaze-tracking module configured to receive gaze-tracking data indicating a user focal point of a user of the mirrorless heads up display device;
   an optical element comprising a lenticular lens or parallax barrier positioned between the display and the at least one micro lens array; and
   a display controller comprising a processor and memory storing instructions executable by the processor to control the display to output image light that passes through the lenticular lens or parallax barrier and the at least one micro lens array and impinges on the windshield to form a three-dimensional image without reflecting the image light by any mirror, a focal point of the three-dimensional image being dynamically changed to create a continuous plane based on the user focal point,
   wherein the lenticular lens comprises an array of cylindrical lenses.

14. The mirrorless heads up display device of claim 13, further comprising an array of backlight light sources distributed as a matrix of individually-controllable light-emitting diodes along a back of the display.

15. The mirrorless heads up display device of claim 14, wherein the instructions are further executable to selectively turn off or dim one or more of the individually-controllable light-emitting diodes based on a content of the three-dimensional image and/or a dynamic condition of the mirrorless heads up display device.

16. The mirrorless heads up display device of claim 15, wherein the instructions are further executable to selectively turn off or dim one or more of the individually-controllable light-emitting diodes based on the user focal point.

17. The mirrorless heads up display device of claim 13, wherein a radius of one or more edge cylindrical lenses of the array have a different radius than one or more other cylindrical lenses of the array.

18. The mirrorless heads up display device of claim 13, wherein the windshield further comprises a transparent organic light emitting diode (OLED) display or a photosensitive material to produce a near-plane image, and wherein the display is configured to produce a far-plane image, the far-plane image being positioned farther in a visual field of view of a viewer than the near-plane image.

* * * * *